United States Patent
Sebastian

(10) Patent No.: US 12,459,740 B2
(45) Date of Patent: Nov. 4, 2025

(54) AUTOMATED SHUTTLE MATERIALS HANDLING AND STORAGE SYSTEMS AND METHODS OF USING THE SAME

(71) Applicant: INTELLIGRATED HEADQUARTERS, LLC, Mason, OH (US)

(72) Inventor: Jarl Nicholas Sebastian, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 1005 days.

(21) Appl. No.: 17/454,735

(22) Filed: Nov. 12, 2021

(65) Prior Publication Data

US 2023/0150770 A1    May 18, 2023

(51) Int. Cl.
- *B65G 1/137* (2006.01)
- *B65G 1/04* (2006.01)
- *B65G 1/06* (2006.01)

(52) U.S. Cl.
CPC ......... *B65G 1/1375* (2013.01); *B65G 1/0492* (2013.01); *B65G 1/065* (2013.01); *B65G 1/1373* (2013.01)

(58) Field of Classification Search
CPC ...... B65G 1/1375; B65G 1/0492; B65G 1/04; B65G 1/1373; B65G 35/00; B65G 1/065
See application file for complete search history.

(56) References Cited

U.S. PATENT DOCUMENTS

| | | | | |
|---|---|---|---|---|
| 7,711,485 B2 * | 5/2010 | Matsumoto | ............ | G01C 21/26 382/104 |
| 8,104,601 B2 * | 1/2012 | Hayduchok | ............... | B07C 7/02 198/347.1 |

(Continued)

FOREIGN PATENT DOCUMENTS

| | | |
|---|---|---|
| CN | 108033184 A | 5/2018 |
| CN | 113401548 A | 9/2021 |

(Continued)

OTHER PUBLICATIONS

Intention to grant Mailed on Jan. 17, 2025 for EP Application No. 22202675, 8 page(s).

(Continued)

*Primary Examiner* — Thomas Randazzo
(74) *Attorney, Agent, or Firm* — Alston & Bird LLP

(57) ABSTRACT

Various embodiments are directed to an automated storage and retrieval system and method of operating the same. In various embodiments, an automated storage and retrieval system comprises a plurality of storage aisles, each defined in part by a unidirectional shuttle traffic flow pattern; a plurality of shuttles configured to travel throughout the system to execute materials handling operations; at least one vertical lift; a plurality of inter-aisle shuttle outlet tracks configured to facilitate shuttle traffic flow in at least substantially the same direction, each comprising: a first inter-aisle shuttle outlet track comprising at least one lift interface position to facilitate shuttle traffic flow to at least one vertical lift; and a second inter-aisle shuttle outlet track arranged in an at least substantially parallel configuration relative to the first inter-aisle shuttle outlet track; wherein the inter-aisle shuttle outlet tracks enable shuttle transfer between the first and second inter-aisle shuttle outlet tracks.

19 Claims, 6 Drawing Sheets

(56) References Cited

U.S. PATENT DOCUMENTS

| | | | |
|---|---|---|---|
| 9,139,363 B2* | 9/2015 | Lert | B65G 1/1373 |
| 10,358,288 B2* | 7/2019 | Hansl | B65G 1/0492 |
| 10,800,617 B2* | 10/2020 | Ueda | B65G 61/00 |
| 10,850,921 B2* | 12/2020 | Conrad | B65G 1/0485 |
| 2011/0094854 A1 | 4/2011 | Hayduchok et al. | |
| 2014/0056672 A1 | 2/2014 | Mathys et al. | |
| 2014/0288696 A1 | 9/2014 | Lert | |
| 2017/0121111 A1 | 5/2017 | Hansl | |
| 2017/0166400 A1 | 6/2017 | Hofmann | |
| 2019/0202635 A1 | 7/2019 | Conrad et al. | |
| 2021/0284444 A1 | 9/2021 | Ranjith et al. | |
| 2022/0297941 A1* | 9/2022 | Gabrieli | B66C 19/00 |
| 2022/0356014 A1* | 11/2022 | Solovianenko | B66F 9/07572 |
| 2022/0356015 A1* | 11/2022 | Razumov | B65G 1/0492 |

FOREIGN PATENT DOCUMENTS

| | | | |
|---|---|---|---|
| EP | 2566789 B1 | 1/2014 | |
| WO | 2017/197121 A1 | 11/2017 | |
| WO | 2021/059007 A1 | 4/2021 | |

OTHER PUBLICATIONS

European search report Mailed on Mar. 31, 2023 for EP Application No. 22202675, 9 page(s).
Decision to grant a European patent Mailed on May 22, 2025 for EP Application No. 22202675, 2 page(s).
CN Office Action Mailed on May 16, 2025 for CN Application No. 202211404968, 15 page(s).
English Translation of CN Office Action dated May 16, 2025 for CN Application No. 202211404968, 17 page(s).

\* cited by examiner

AUTOMATED SHUTTLE MATERIALS HANDLING AND STORAGE SYSTEMS AND METHODS OF USING THE SAME

FIELD OF THE INVENTION

Example embodiments of the present invention relate generally to material handling systems for handling items, and, more particularly, to techniques for using a plurality of shuttles to move objects to and/or from various storage locations within a material handling system.

BACKGROUND

Automated Storage and Retrieval Systems (ASRS), such as ASRS product lifts and automated shuttles configured to move along shuttle guide tracks, are used as material handling systems to facilitate movement of high volumes of articles and maximize the use of valuable storage space. ASRSs are key components in material handling environments by combining automation, software, and labor to optimize the productivity and throughput in a variety of operations. Furthermore, ASRSs provide flexibility and speed allowing use in applications ranging from e-commerce and omnichannel fulfillment to article distribution. Applicant has identified several technical challenges associated with utilizing automated shuttles in an ASRS to retrieve objects stored at discrete storage locations within a storage rack arrangement. Through applied effort, ingenuity, and innovation, many of these identified challenges have been overcome by developing solutions that are included in embodiments of the present invention, many examples of which are described in detail herein.

BRIEF SUMMARY

Various embodiments are directed to an automated storage and retrieval system and methods of using the same. Various embodiments re directed to an automated storage and retrieval system comprising: a plurality of storage aisles, each storage aisle comprising a plurality of storage locations positioned adjacent to an aisle track that extends along an aisle length; a plurality of shuttles configured to travel throughout the automated storage and retrieval system to execute a materials handling operation; at least one vertical lift; a plurality of inter-aisle shuttle outlet tracks configured to facilitate shuttle traffic flow in at least substantially the same direction, the plurality of inter-aisle shuttle outlet tracks comprising: a first inter-aisle shuttle outlet track configured to facilitate shuttle traffic flow to the at least one vertical lifts via at least one lift interface position defined along the first inter-aisle shuttle outlet track; and a second inter-aisle shuttle outlet track arranged in an at least substantially parallel configuration relative to the first inter-aisle shuttle outlet track; wherein the plurality of inter-aisle shuttle outlet tracks is configured to enable a transfer of at least one of the plurality of shuttles between the first inter-aisle shuttle outlet track and the second inter-aisle shuttle outlet track at one or more transfer locations along the first inter-aisle shuttle outlet track; wherein the aisle track of each storage aisle of the plurality of storage aisles is configured to facilitate shuttle traffic flow along the aisle length thereof in a first shuttle travel direction such that each of the plurality of storage aisles is defined in part by a unidirectional shuttle traffic flow pattern.

In various embodiments, the automated storage and retrieval system may further comprise a central controller configured to transmit instructional signals to each of the plurality of shuttles to cause the plurality of shuttles to travel throughout the automated storage and retrieval system. In various embodiments, the plurality of storage aisles may be defined by further comprising a rack arrangement comprising a plurality of storage racks, each storage rack being defined by a plurality of storage shelves arranged in a vertically stacked configuration such that the rack arrangement comprises a plurality of rack arrangement levels, wherein each of the plurality of storage aisles is provided within a first rack arrangement level. In certain embodiments, the plurality of storage racks may be arranged in an at least substantially parallel configuration such that each of the plurality of storage aisles is parallel to one another.

In various embodiments, the automated storage and retrieval system may further comprise an inter-aisle shuttle inlet track operatively connected to a respective aisle inlet end of each of the plurality of storage aisles such that each of the plurality of storage aisle is accessible to the plurality of shuttles via the inter-aisle shuttle inlet track, wherein the inter-aisle shuttle inlet track is configured to facilitate unidirectional shuttle traffic flow along a shuttle inlet track length thereof. In certain embodiments, the automated storage and retrieval system may further comprise a shuttle transport track extending from the plurality of inter-aisle shuttle outlet tracks to the inter-aisle shuttle inlet track so as to facilitate transportation of the plurality of shuttles from the plurality of inter-aisle shuttle outlet tracks to the inter-aisle shuttle inlet track. Further, in certain embodiments, the automated storage and retrieval system may be configured to enable a shuttle recirculation traffic flow pattern defined at least in part by respective unidirectional shuttle traffic flow patterns along each of the shuttle transport track, the inter-aisle shuttle inlet track, the plurality of inter-aisle shuttle outlet tracks, and at least one of the plurality of storage aisles.

In various embodiments, the automated storage and retrieval system may further comprise a shuttle storage position that is defined by a shuttle guide track segment along which the automated storage and retrieval system is configured to store one or more of the plurality of shuttles that are configured in a standby configuration at a particular instance. In certain embodiments, the shuttle storage position may be defined along a secondary shuttle transport track extending at least partially between the plurality of inter-aisle shuttle outlet tracks and an inter-aisle shuttle inlet track operatively connected to each of the plurality of storage aisles. In various embodiments, the first inter-aisle shuttle outlet track may be defined at least in part by a first track length and the second inter-aisle shuttle outlet track is defined at least in part by a second track length that is at least substantially equal to the first track length.

Various embodiments are directed to a method of operating an automated storage and retrieval system using a unidirectional shuttle traffic flow pattern, the method comprising: providing an automated storage and retrieval system comprising a first storage aisle, the first storage aisle comprising an aisle track extending along an aisle length and a plurality of storage locations positioned at least substantially adjacent the aisle track, wherein the aisle track is configured to facilitate movement of a plurality of shuttles along the first storage aisle in a shuttle travel direction defined along the aisle length; causing a first shuttle to travel to a first storage location provided within the first storage aisle such that the first shuttle moves along an aisle track of the first storage aisle in a first shuttle travel direction; causing a second shuttle to travel to a second storage location provided within the first storage aisle such that the second shuttle moves along the aisle track of the first storage aisle in the first shuttle travel direction and such that both the first shuttle and the second shuttle are positioned within the first storage aisle at a first instance; and causing the first shuttle to travel in the first shuttle travel direction from the first storage location to a first storage aisle outlet of the first storage aisle.

In various embodiments, the method may further comprise causing the second shuttle to travel along the aisle track in the first shuttle travel direction to the first storage aisle outlet. In various embodiments, the method may further comprise accessing, via the first shuttle, a first vertical lift of a plurality of vertical lifts by causing the first shuttle to travel from the first storage aisle to a first lift interface position defined along a first inter-aisle shuttle outlet track. Further, in various embodiments, the method may further comprise determining that the first shuttle is stopped along the first inter-aisle outlet track at a first lift interface position; identifying that the second shuttle traveling along the first inter-aisle outlet track is in an upstream position relative to the first shuttle; and causing the second shuttle to transfer from the first inter-aisle outlet track to a second inter-aisle outlet track arranged in an at least substantially parallel configuration relative to the first inter-aisle shuttle outlet track. In certain embodiments, the method may further comprise upon determining that the second shuttle has moved along the second inter-aisle shuttle outlet track so as to pass the first shuttle, causing the second shuttle to transfer from the second inter-aisle outlet track to the first inter-aisle outlet track; and accessing, via the second shuttle, a second vertical lift of the plurality of vertical lifts by causing the second shuttle to travel to a second lift interface position defined along the first inter-aisle shuttle outlet track, wherein the second lift interface position is arranged downstream from the first lift interface position along the first inter-aisle shuttle outlet track.

In various embodiments, the method may further comprise determining a system bandwidth of the automated storage and retrieval system based at least in part on a number of shuttles of the plurality of shuttles determined to be executing a materials handling operation at a measurement instance; identifying a third shuttle of the plurality of shuttles this is configured in a standby configuration; providing instructions to the third shuttle to execute a third materials handling operation, so as to increase the number of shuttles of the plurality of shuttles in operation within the automated storage and retrieval system. In various embodiments, the method may further comprise causing a third shuttle to travel to a third storage location provided within the first storage aisle such that the third shuttle moves along the aisle track of the first storage aisle in the first shuttle travel direction and such that each of the first shuttle, the second shuttle, and the third shuttle are positioned within the first storage aisle at the first instance. In various embodiments, the method may further comprise upon determining that that the first shuttle has executed a first materials handling operation, providing instructions to the first shuttle to execute a second materials handling operation, including causing the first shuttle to travel to a third storage location provided within the first storage aisle such that the first shuttle moves along the aisle track of the first storage aisle in the first shuttle travel direction. Further, in certain embodiments, the automated storage and retrieval system comprises a plurality of storage aisles, and wherein the method may further comprise identifying that first storage aisle outlet of the first storage aisle is arranged in an upstream position from a first lift interface portion corresponding to a first vertical lift relative to a unidirectional shuttle recirculation traffic flow pattern defined by the automated storage and retrieval system; and wherein causing the first shuttle to travel to the first storage location provided within the first storage aisle comprises selectively causing the first shuttle to travel to the first storage aisle of the plurality of storage aisles based at least in part on the upstream position of the first storage aisle outlet relative to the first lift interface portion corresponding to the first vertical lift.

Various embodiments are directed to an automated storage and retrieval system comprising: at least one storage aisle comprising a plurality of storage locations positioned adjacent to an aisle track that is defined by an aisle length, wherein the storage aisle is defined in part by a unidirectional shuttle traffic flow pattern that extends along the aisle length; a plurality of shuttles configured to travel throughout the automated storage and retrieval system to execute a materials handling operation; a plurality of shuttle outlet tracks configured to facilitate shuttle traffic flow from the storage aisle to each of object disposal positions, the plurality of shuttle outlet tracks comprising: an object disposal track configured to facilitate shuttle traffic flow in a first shuttle travel direction along the object disposal track to at least one of a plurality of object disposal positions defined along the object disposal track; and a parallel passing track arranged in an at least substantially parallel configuration relative to the object disposal track and configured to facilitate shuttle traffic flow in the first shuttle travel direction along the parallel passing track; wherein the plurality of shuttle outlet tracks is configured to enable a transfer of at least one of the plurality of shuttles between the object disposal track and the parallel passing track at one or more transfer locations along a track length of the object disposal track.

BRIEF DESCRIPTION OF THE DRAWINGS

Reference will now be made to the accompanying drawings, which are not necessarily drawn to scale, and wherein.

DETAILED DESCRIPTION

Figure 1:
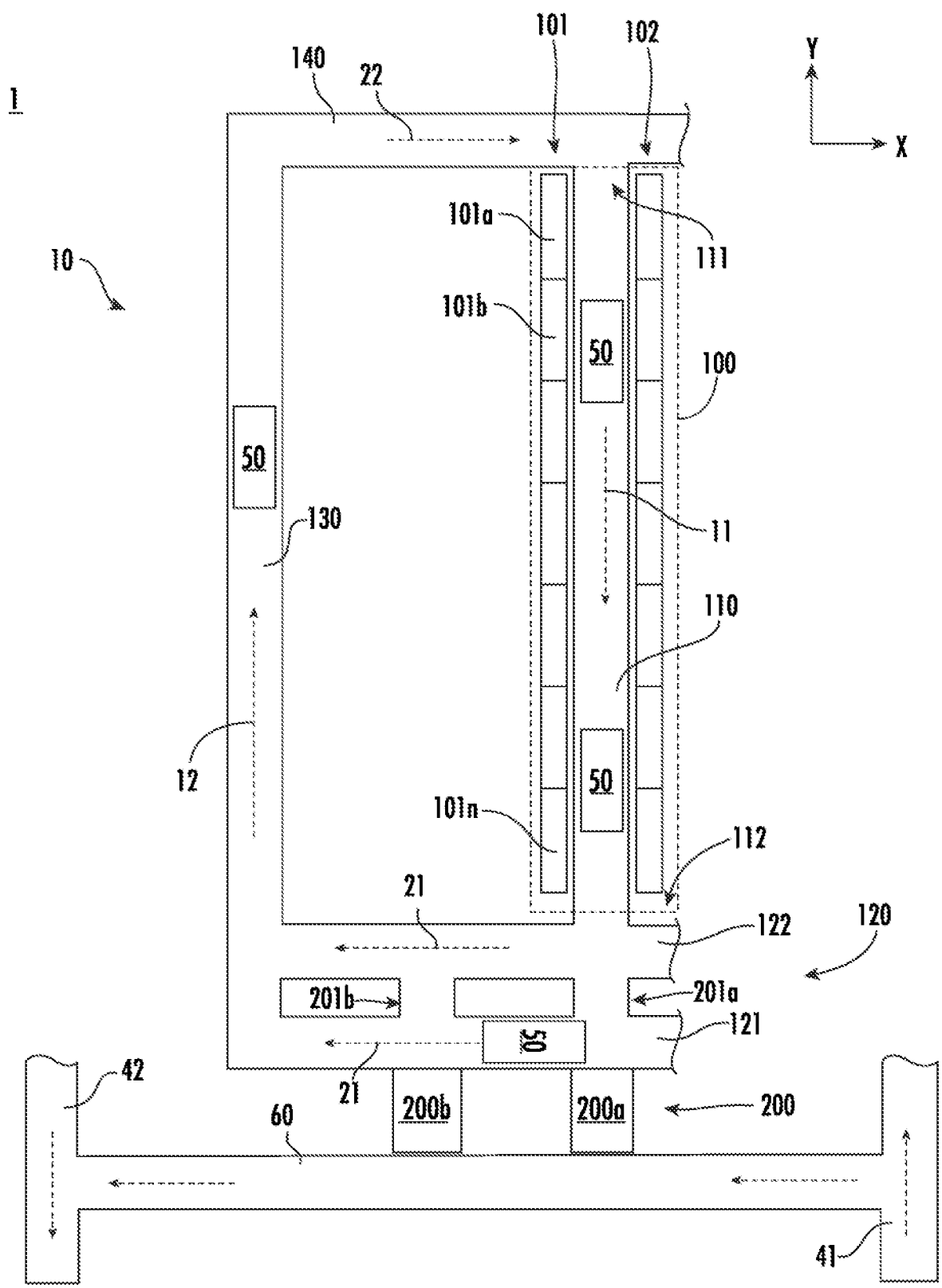
FIG. 1 illustrates a schematic view of an exemplary automated storage and retrieval system according to various embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The words "lateral," longitudinal," and "vertical," when used herein, are intended to be used for referential and/or illustrative purposes in order to provide context for one or more aspects of the present invention, and should be strictly interpreted as being limited a particular universal direction. By way of non-limiting example, as described herein with reference to the directional references provided in the figures, the "lateral" direction may extend along an x-axis, a "longitudinal" direction may extend perpendicularly within at least substantially the same plane as a lateral direction, such as, for example, along a y-axis, and a "vertical" direction may extend perpendicularly within an at least substantially perpendicular plane relative to both the lateral and longitudinal directions, such as, for example, along an a z-axis.

The components illustrated in the figures represent components that may or may not be present in various embodiments of the invention described herein such that embodiments may include fewer or more components than those shown in the figures while not departing from the scope of the invention.

Overview

Automated storage and retrieval systems may utilize various material handling products such as various carriages, carts, lifts, conveyors, and/or the like to facilitate the transportation of objects to a desired delivery location within a factory or a warehouse. For example, automated shuttles may be used to transport objects to and/or from various storage locations organized along storage aisles arranged within a storage environment. Further, a vertical lift assembly may be used to facilitate the vertical transportation of one or more objects between different levels of a storage rack or other storage environment. Various automated storage and retrieval systems may include a shuttle provided within each storage aisle of the system that is configured execute a retrieval operation by moving in a first direction along the storage aisle to a storage location, retrieving an object disposed within the storage location, and returning to a vertical lift provided adjacent the storage aisle by moving in a second direction opposite the first direction along the storage aisle to the vertical lift. For example, such automated storage and retrieval systems may provide a vertical lift adjacent each storage aisle defined therein such that the shuttle configured for bidirectional travel within that particular storage aisle can access a respective vertical lift adjacent thereto in order to facilitate the transportation of an object between the storage aisle and a remote location within a materials handling environment.

The present invention relates to an automated storage and retrieval system comprising a plurality of storage aisles, each comprising an aisle track configured to facilitate shuttle traffic flow of a plurality of shuttles along the aisle length thereof in a first shuttle travel direction such that each of the plurality of storage aisles is defined in part by a unidirectional shuttle traffic flow pattern. As described herein, the exemplary AS/RS is configured such that the plurality of shuttles are transported throughout the AS/RS according to a shuttle recirculation traffic flow pattern defined at least in part by the unidirectional shuttle traffic flow pattern of each of the plurality of parallel storage aisles. The present invention is preferable to automated storage and retrieval systems comprising shuttles that are limited to bidirectional travel along respective storage aisles, as the unidirectional shuttle traffic flow pattern in each of the storage aisles of the AS/RS at least substantially eliminates the risk of gridlock and/or traffic backup caused by two shuttles simultaneously positioned within the same storage aisle that are moving in opposing directions and/or along conflicting shuttle traffic paths. As such, the present invention allows for the AS/RS to be operated such that a plurality of shuttles executing respective materials handling operations may be positioned within the same storage aisle at the same time, thereby increasing system output by minimizing the inefficiencies associated with the travel time of bidirectional shuttles to and from various storage locations within a single storage aisle.

Further, the present invention includes an AS/RS comprising a plurality inter-aisle shuttle outlet tracks configured to facilitate shuttle traffic flow in at least substantially the same direction, including a first inter-aisle shuttle outlet track configured to facilitate shuttle traffic flow to each of a plurality of vertical lifts via corresponding lift interface positions defined along the first inter-aisle shuttle outlet track, and a second inter-aisle shuttle outlet track arranged in an at least substantially parallel configuration relative to the first inter-aisle shuttle outlet track. As described herein, the plurality of inter-aisle shuttle outlet tracks is configured to enable a transfer of at least one of the plurality of shuttles between the first inter-aisle shuttle outlet track and the second inter-aisle shuttle outlet track at one or more transfer locations along the first inter-aisle shuttle outlet track. In such an exemplary configuration, the plurality of inter-aisle shuttle outlet tracks of the AS/RS may embody parallel passing lanes that provide access for each of the plurality of shuttles within a particular level of the AS/RS to access each of the plurality of vertical lifts for executing various storage and/or retrieval operations, thereby maximizing the efficiency and collective output of the plurality of vertical lifts. Further, the plurality of inter-aisle shuttle outlet tracks of the present invention, as described herein, may facilitate an at least substantially continuous flow of shuttle traffic throughout the AS/RS by providing the second inter-aisle shuttle outlet track that may be selectively used as a passing lane to which at least a portion of the shuttles may be transferred (e.g., from the first inter-aisle shuttle outlet track) to avoid a shuttle stopped at a lift interface position along the first inter-aisle shuttle outlet track, thereby at least substantially maximizing system throughput by minimizing bottlenecks that my result from traffic interferences within the AS/RS.

In various embodiments, a material handling system may include an exemplary automated storage and retrieval system (AS/RS) comprising a rack arrangement comprising a plurality of storage racks. For example, a storage rack of the AS/RS may be defined as a series of vertically arranged shelves, each supported by a support frame (e.g., a post and beam rack). The support frame may comprise vertical support members separating various levels within the storage rack, and horizontal support members supporting individual shelves. Each shelf may define and/or comprise a plurality of storage locations (e.g., separated into one or more bays) configured for storing at least one object (e.g., a storage container, a product, a spool, and/or other object configurations) therein. In various embodiments, wherein the rack arrangement of the AS/RS comprises a plurality of storage racks, the rack arrangement may be defined at least in part by a plurality of rack arrangement levels, each corresponding to a respective level of the rack arrangement defined within a corresponding at least substantially horizontal plane. For example, in an exemplary circumstance wherein a rack arrangement of an exemplary AS/RS comprises a plurality of storage racks, each comprising a plurality of storage shelves arranged in a vertically stacked configuration such that each storage rack is defined by a plurality of storage rack levels, a rack arrangement level may be defined collectively by each of the storage rack levels from the storage racks of the rack arrangement that are defined within a common (e.g., at least substantially the same) horizontal plane (e.g., level). Further, a rack arrangement level defined within an at least substantially horizontal plane may be defined by each storage shelf (e.g., each of the storage locations provided therein) of the plurality of storage racks that is provided within the least substantially horizontal plane.

In various embodiments, the plurality of racks of a rack arrangement of the AS/RS may be arranged such that two adjacent storage racks are provided in an at least substantially parallel configuration relative to one another. As described in further detail herein, two adjacent storage racks may be arranged such that an aisle is provided therebetween. For example, the aisle may be defined at least in part by the perpendicular separation distance between adjacent storage racks.

Further, as described herein, an exemplary AS/RS may comprise a plurality of shuttle guide tracks extending along and/or between each of the plurality of storage racks of the rack arrangement. The plurality of shuttle guide tracks may be configured such that a plurality of automated shuttles configured for travel thereon may move along the tracks between various racks (e.g., storage locations) within the rack arrangement. In various embodiments, the plurality of shuttle guide tracks of the AS/RS may comprise a plurality of aisle tracks, each provided along a respective aisle length between a respective pair of two adjacent storage racks. As described in further detail herein, an exemplary AS/RS may comprise a plurality of storage aisles, each comprising a first storage shelf and a second storage shelf, defined by respective portions of adjacent first and second storage racks that are provided in the same rack arrangement level (e.g., within at least substantially the same horizontal plane), and an aisle track extending between the first storage shelf and the second storage shelf along an aisle length such that each of the storage locations within the first and second storage shelves are accessible to a shuttle via the aisle track provided therebetween.

In various embodiments, a shuttle of the AS/RS may be configured for movement along each of the plurality of shuttle guide tracks provided within a rack arrangement level of the system (e.g., within a singular horizontal plane). For example, the plurality of shuttle guide tracks may comprise a first plurality of shuttle guide tracks provided within a first rack arrangement level and configured to enable shuttle transportation of a first plurality of shuttles to and/or from a first storage aisle defined by a first storage shelf, a second storage shelf, and a first aisle track provided within the first rack arrangement level. In such an exemplary circumstance, the plurality of shuttle guide tracks of the same AS/RS may further comprise a second plurality of shuttle guide tracks provided within a second rack arrangement level and configured to enable shuttle transportation of a second plurality of shuttles to and/or from a second storage aisle defined by a third storage shelf, a fourth storage shelf, and a second aisle track provided within the second rack arrangement level. Further, in various embodiments, as described in further detail herein, a rack arrangement of an exemplary AS/RS may comprise a plurality of storage racks arranged such that each rack arrangement level of the AS/RS comprises a plurality of storage aisles, each of which may be accessible to a shuttle configured to travel along the plurality of shuttle guide tracks within the rack arrangement level.

FIG. 1 illustrates a schematic view of an exemplary automated storage and retrieval system according to various embodiments described herein. In particular, FIG. 1 illustrates a schematic view of an exemplary rack arrangement level 10 of an AS/RS 1, the rack arrangement level 10 comprising a storage aisle 100. As shown, a storage aisle 100 may be defined by various components of an exemplary rack arrangement that are provided within at least substantially the same horizontal plane, including, for example, a first storage shelf 101 and a second storage shelf 102 of adjacent first and second storage racks, respectively. As illustrated, the first and second storage shelves 101, 102 of an exemplary storage aisle 100 may each extend in an at least substantially longitudinal direction, such as, for example, in the y-direction, as illustrated, and may be arranged in an at least substantially parallel configuration relative to one another. An exemplary storage aisle 100 may further include an aisle track 110 extending between the first and second storage shelves 101, 102 in at least substantially the same longitudinal direction as the first and second storage shelves 101, 102 provided on either side thereof. For example, the aisle track 110 of a storage aisle 100 may be arranged in an at least substantially parallel configuration relative to one or both of the first and second storage shelves 101, 102 adjacent thereto. As shown, an aisle track 110 may be defined at least in part by an aisle length that extends between the first aisle end 111 and the second aisle end 112 thereof.

In various embodiments, the AS/RS 1 may comprise a plurality of automated shuttles 50 configured to travel along the plurality of shuttle guide tracks provided within a rack arrangement level to facilitate the retrieval, storage, and/or transportation of various objects throughout the AS/RS 1. In various embodiments, a plurality of shuttles 50 may be disposed along each rack arrangement level of the rack arrangement. As such, the shuttle(s) 50 may be configured to move along the plurality of shuttle guide tracks provided within a rack arrangement level 10 in order to selectively remove and/or place objects into a storage location within a storage shelf (e.g., first storage shelf 101, second storage shelf 102) provided within the rack arrangement level 10. For example, as illustrated, an exemplary aisle track 110 may be configured to enable shuttle traffic along the aisle length thereof in order to facilitate movement of one or more of the plurality of automated shuttles 50 to and/or from one or more storage locations within the storage aisle 100. In such an exemplary configuration, a shuttle 50 may travel along aisle track 110 in order to retrieve and/or dispose an object into one of the plurality of storage locations provided within either the first storage shelf 101 (e.g., first storage location 101*a*, second storage location 101*b*, third storage location 101*n*, and/or the like) or the second storage shelf 102.

In various embodiments, the shuttle 50 may be any type of one-level shuttle (OLS) vehicle typically used in a AS/RS, such as a shuttle, a carrier, a bot, and/or the like. In various embodiment, the shuttle 50 may be a self-contained unit, receiving power (e.g., 48 VDC) from a bus bar located inside a shuttle guide track that may be mounted to the storage rack. In various embodiments, the power guide track (e.g., 48 VDC power supplied to the track) may be powered from a DC power panel. In various embodiments, a single DC power panel can power a plurality of shuttles (e.g., up to six shuttles). In various embodiments, the shuttle 50 may receive control system commands over a Wireless Local Area Network (WLAN). In various embodiments, a shuttle 50 may have one or more wheels to facilitate movement thereof along a shuttle guide track via a motor. In various embodiments, the shuttle guide track may be affixed to the storage rack. However, it should be understood that any of a variety of movement mechanisms may be utilized for moving the shuttle 50 (e.g., belt-drive systems, magnetic movement mechanisms, chain-drive systems, and/or the like). Moreover, it should be understood that the movement mechanisms may be defined within the shuttle 50 (e.g., a motor positioned on the shuttle) or within the storage rack (e.g., motors within the storage rack). In various embodiments, an exemplary shuttle 50 may comprise one or more sensors configured movement of the shuttle 50 to an intended storage location and/or engagement of the shuttle 50 with a particular object in a given storage location. For example, the shuttle 50 may be equipped with a proximity sensor to determine the longitudinal and/or lateral position of the shuttle 50 within a given rack arrangement level (e.g., by identifying the storage aisle in which the shuttle 50 is positioned, identifying one or more storage locations disposed at least substantially adjacent the shuttle 50, and/or the like, or any combination thereof), and/or the position of the shuttle 50 relative to one or more other shuttles of the plurality provided within the same rack arrangement level 10. In various embodiments, the shuttle 50 may also be equipped with sensors and onboard devices, such as Wi-Fi antenna for communication with a Warehouse Control System (WCS) and/or Warehouse Execution System (WES), overload protection, one or more power supplies (e.g., 24 Volt power supply and/or 48 volt power supply), digital input and output modules, and/or the like.

Further, an exemplary AS/RS 1 may comprise a plurality of vertical lifts 200 configured to facilitate the vertical transportation of objects between the multiple levels of the AS/RS 1. For example, at least a portion of the plurality of lifts 200 of the AS/RS 1 may be configured to receive an object retrieved by a shuttle 50 from a storage aisle 100 provided within a rack arrangement level 10 (e.g., from an exemplary storage location 101*a* within a first storage shelf 101 of the storage aisle 100) and vertically move (e.g., lower) the retrieved object to a lift drop-off station 60. The lift drop-off station 60 may be connected to an out-feed conveyor 42 that is configured to deliver the object retrieved by the shuttle 50 from within the rack arrangement level 10 to a downstream location, such as, for example, a destination location within a manufacturing environment. Alternatively, and/or additionally, at least a portion of the plurality of lifts 200 of the AS/RS 1 may be configured to receive an object to be stored at a storage location within the first rack arrangement level 10 of the AS/RS 1 at the lift drop-off station 60, wherein the object to be stored may be delivered to the lift drop-off station 60 via an in-feed conveyor 41 configured to deliver the object to be stored from an upstream location to the lift drop-off station 60. At least a portion of the plurality of lifts 200 may be configured to vertically move (e.g., raise) the object to be stored from the lift drop-off station 60 to a first rack arrangement level 10, wherein it may be transferred to one of the plurality of shuttles 50 provided along the plurality of tracks within the rack arrangement level 10 and delivered to a storage location within an exemplary storage aisle 100. As described in further detail herein, at least a portion of the plurality of lifts provided within the AS/RS 1 may be positioned in an at least substantially aligned configuration, such as, for example, along a second aisle end (e.g., an aisle outlet end) such that the plurality of shuttles provided in the AS/RS 1 may access the at least a portion of the plurality of lifts 200 upon exiting a storage aisle (e.g., storage aisle 100). Additionally, or alternatively, in various embodiments, one or more of the plurality of lifts may be positioned along an aisle length of one or more storage aisles (e.g., adjacent one or more of the storage shelves aligned along the corresponding aisle track), so as to embody an intra-aisle lift that may be accessed by a shuttle travelling in a shuttle travel direction along the corresponding aisle track.

In various embodiments, an exemplary AS/RS 1 may be operated such that each shuttle 50 that is moved throughout a storage aisle 100 travels in the same singular direction (e.g., a shuttle travel direction) along the aisle track 110 from the first aisle end 111 to the second aisle end 112. As such, each storage aisle 100 of an exemplary AS/RS 1 may be defined in part by a unidirectional shuttle traffic flow pattern that is defined along the aisle track 110 thereof. For example, in various embodiments, the plurality of shuttle guide tracks within a particular rack arrangement level of an AS/RS 1 may be configured such that a shuttle 50 executing a retrieval operation relating to an object disposed within a storage location 101*a* provided within the storage aisle 100 may be received by the aisle track 110 of the storage aisle 100 at a first aisle end 111 thereof. The storage aisle 100 may be configured to facilitate a unidirectional shuttle traffic flow along the aisle length of the aisle track 110, such that each shuttle 50 traveling along the aisle track 110 moves in a shuttle travel direction, such as, for example, in a first longitudinal direction 11 (e.g., in the negative y-direction as illustrated). For example, the shuttle 50 may stop at a position along the aisle track 110 that is adjacent to the designated storage location 101*a* defined within the first storage shelf 101 of the storage aisle 100 in order to access to object disposed therein. In such an exemplary configuration, upon retrieving the object from the storage location 101*a*, the shuttle 50 may continue travelling in the shuttle travel direction (e.g., the first longitudinal direction 11) towards the second aisle end 112 of the aisle track 110. As described herein, in an exemplary circumstance wherein an AS/RS 1 is operated such that each storage aisle 100 provided therein defines a unidirectional shuttle traffic flow pattern from a first aisle end 111 to a second aisle end 112, a plurality of shuttles 50 may at least substantially simultaneously travel to a respective plurality of storage locations (e.g., storage locations 101*a*, 101*b*, 101*n*) with the same storage aisle 100 such that the plurality of shuttles 50 are each positioned along the aisle track 110 at substantially the same time. By operating the AS/SR 1 that each of the shuttles 50 travel along the aisle track 110 of a storage aisle 100 in the same shuttle travel direction (e.g., the first longitudinal direction 11) the risk of shuttle collision and/or shuttle traffic flow bottlenecks caused by two or more shuttles 50 being moved along intersecting, overlapping, and/or otherwise incompatible shuttle travel paths along the same aisle track 110 may be at least substantially mitigated.

In various embodiments, such a unidirectional shuttle traffic flow pattern of each storage aisle 100 within a rack arrangement level 10 may be enabled by a looped track configuration of the plurality of shuttle guide tracks provided within the rack arrangement level 10. For example, the plurality of shuttle guide tracks provided within a rack arrangement level 10 may be arranged so as to define an looped track circuit comprising an at least partially closed looped configuration, wherein an exemplary shuttle 50, upon having travelled along the aisle length of the aisle track 110 in the first longitudinal direction 11 to the second aisle end 112, may exit the storage aisle 100 and travel along at least a portion of the looped track circuit to be recirculated to the first aisle end 111 of the aisle track 110. In various embodiments, an exemplary AS/RS 1 comprising a storage aisle 100 provided within a rack arrangement level 10 and configured to facilitate shuttle transportation along an aisle track 110 thereof according to a unidirectional shuttle traffic flow pattern defined at least in part by the first longitudinal direction 11 may further include a plurality of shuttle guide tracks provided within the rack arrangement level 10 that collectively facilitate a shuttle recirculation traffic flow pattern. In various embodiments, as illustrated in FIG. 1, such an exemplary rack arrangement level 10 of an AS/RS 1 may include a plurality of shuttle guide tracks comprising the aisle track 110 of the storage aisle 100, a shuttle transport track 130, an inter-aisle shuttle inlet track 140, and a plurality of inter-aisle shuttle outlet tracks 120.

In various embodiments, the aisle track 110 of a storage aisle 100, the shuttle transport track 130, the inter-aisle shuttle inlet track 140, and the plurality of inter-aisle shuttle outlet tracks 120 provided within the rack arrangement level 10 may collectively define a looped track circuit configured such that the plurality of shuttles 50 provided within the rack arrangement level 10 may travel along the aforementioned shuttle guide tracks so as to define a shuttle recirculation traffic flow pattern defined at least part by a plurality of shuttles 50 serially travelling along the aisle track 110 in the first longitudinal direction 11 (e.g., from the first aisle end 111 to the second aisle end 112). For example, the shuttle recirculation traffic flow pattern exhibited by the illustrated plurality of shuttles 50 travelling throughout the rack arrangement level 10 may be defined at least in part by two or more shuttles 50 of the plurality being at least substantially simultaneously positioned within the storage aisle 100 (e.g., travelling along the aisle track 110 in the first longitudinal direction 11) at respective positions along the aisle length thereof. In various embodiments, each of the plurality of shuttle guide tracks that define at least a portion of the looped track circuit provided within a rack arrangement level 10 may be configured to define a unidirectional shuttle traffic flow pattern along the track length thereof. For example, each of the shuttle transport track 130, the inter-aisle shuttle inlet track 140, and the plurality of inter-aisle shuttle outlet tracks 120 are configured for unidirectional shuttle traffic along their respective track lengths such that a shuttle travelling thereon moves in a respective singular direction along the length of the shuttle guide track. Accordingly, in various embodiments wherein the shuttle transport track 130, the inter-aisle shuttle inlet track 140, the plurality of inter-aisle shuttle outlet tracks 120, and the aisle track 110 are arranged in an at least substantially continuous looped track circuit that connects the second aisle end 112 of the aisle track 110 to the first aisle end 111, as illustrated in FIG. 1, the plurality of shuttle guide tracks within the rack arrangement level 10 are configured to facilitate an at least generally clockwise—or, alternatively, counterclockwise—shuttle recirculation traffic flow pattern through the looped track circuit, as described herein.

In various embodiments, a plurality of inter-aisle shuttle outlet tracks 120 may collectively define a segment of shuttle guide tracks extending between a second aisle end 112 of a storage aisle 100 and a shuttle transportation track 130. Further, the plurality of inter-aisle shuttle outlet tracks 120 may be arranged to as to facilitate transportation of a shuttle 50 from a storage aisle 100 and to each of a plurality of vertical lifts 200 provided within an AS/RS 1. For example, the plurality of inter-aisle shuttle outlet tracks 120 may be arranged so as to extend in a direction that at least substantially intersects a second aisle end 112 of each of the storage aisles 100 provided within a rack arrangement level 10 (e.g., in an at least substantially a perpendicular direction relative to the aisle length). Accordingly, in various embodiments, the plurality of inter-aisle shuttle outlet tracks 120 may be at least substantially immediately downstream from each of the storage aisles 100 within the rack arrangement level 10 such that a shuttle 50 travelling along the aisle track 110 according to the unidirectional shuttle traffic flow pattern, as described herein, may exit the storage aisle 100 via a respective second aisle end 112 and be received by the plurality of inter-aisle shuttle outlet tracks 120. Further, the plurality of inter-aisle shuttle outlet tracks 120 may be arranged to extend at least substantially between each of the plurality of lifts 200 of the AS/RS 1 such that each of the plurality of lifts 200 is accessible to a shuttle 50 via the plurality of inter-aisle shuttle outlet tracks 120. For example, in various embodiments, each of the plurality of lifts 200 is accessible to a shuttle 50 via a corresponding lift interface position defined along the plurality of inter-aisle shuttle outlet tracks 120, such that a shuttle 50 travelling in the first lateral direction 21 along the plurality of inter-aisle shuttle outlet tracks 120 may be stopped at a lift interface position thereon in order to dispense and/or retrieve an object from a corresponding lift 200 adjacent thereto.

As illustrated in FIG. 1, an exemplary AS/RS 1 may comprise a plurality of lifts 200 arranged in an at least substantially aligned configuration in one or more directions, such as, for example, in a substantially lateral distribution (e.g., distributed along the x-axis, as illustrated). As such, the plurality of inter-aisle shuttle outlet tracks 120 may be arranged in an at least substantially perpendicular configuration relative to the aisle track 110 such that a shuttle 50 traveling along one of the plurality of inter-aisle shuttle outlet tracks 120 moves along the track length thereof in a first lateral direction 21 (e.g., in the negative x-direction as illustrated). In various embodiments, the plurality of inter-aisle shuttle outlet tracks 120 may comprise a first inter-aisle shuttle outlet track 121 and a second inter-aisle shuttle outlet track 122 arranged in an at least substantially parallel configuration relative to one another. Each of the first inter-aisle shuttle outlet track 121 and the second inter-aisle shuttle outlet track 122 may be configured to define a unidirectional shuttle traffic flow pattern along a respective track length thereof. For example, both the first inter-aisle shuttle outlet track 121 and the second inter-aisle shuttle outlet track 122 may be configured such that exemplary shuttles 50 travelling along the respective inter-aisle shuttle outlet tracks 121, 122 may move in a first lateral direction 21.

For example, as illustrated, the first inter-aisle shuttle outlet track 121 of the plurality 120 may extend at least substantially between the plurality of lifts 200 of the AS/RS 1 such that each of the plurality of lifts 200 may be accessed by a shuttle 50 travelling along the first inter-aisle shuttle outlet track 121 via a corresponding plurality of lift interface positions defined along the first inter-aisle shuttle outlet track 121. As described herein, a shuttle 50 travelling in the first lateral direction 21 along the first inter-aisle shuttle outlet track 121 may stop along the first inter-aisle shuttle outlet track 121 at a lift interface position adjacent a corresponding lift (e.g., adjacent a first vertical lift 200a or a second vertical lift 200b of the plurality 200) in order to dispense and/or retrieve an object from the corresponding lift of the plurality 200. As further illustrated in FIG. 1, the second inter-aisle shuttle outlet track 122 of the plurality of inter-aisle shuttle outlet tracks 120 may be arranged at least substantially adjacent the first inter-aisle shuttle outlet track 121 and configured to extend at least substantially parallel direction relative to the first inter-aisle shuttle outlet track 121. A plurality of inter-aisle shuttle outlet tracks 120 defined by such an exemplary configuration may enable parallel shuttle traffic flow patterns in the first and second inter-aisle shuttle outlet tracks 121, 122 that are defined by respective unidirectional traffic flows in the first lateral direction 21 along each of the parallel track lengths. In various embodiments, the plurality of inter-aisle shuttle outlet tracks 120 are configured such that a shuttle 50 travelling in the first lateral direction 21 along either the first inter-aisle shuttle outlet track 121 or the second inter-aisle shuttle outlet track 122 may be selectively transferred to the adjacent, parallel inter-aisle shuttle outlet track of the plurality 120. For example, in various embodiments, wherein a first shuttle 50 is traveling in the first lateral direction 21 along the first inter-aisle shuttle outlet track 121 and a second shuttle 50 is stopped along the first inter-aisle shuttle outlet track 121 in a downstream position relative to the first shuttle 50 at a lift interface position corresponding to a second vertical lift 200b, the plurality of inter-aisle shuttle outlet tracks 120 may be configured such that the first shuttle 50 may be transferred to the second inter-aisle shuttle outlet track 122. Upon being moving from the first inter-aisle shuttle outlet track 121 to the second inter-aisle shuttle outlet track 122, the first shuttle 50 may continue to travel in the first lateral direction 21 (e.g., along the second inter-aisle shuttle outlet track 122) according to the shuttle recirculation traffic flow pattern, thereby avoiding a traffic stoppage along the first inter-aisle shuttle outlet track 121 that may result from the at least temporarily stationary second shuttle 50 being engaged with the second lift 200b.

In such an exemplary configuration, wherein the plurality of inter-aisle shuttle outlet tracks 120 are arranged in an at least substantially parallel configuration and configured for unidirectional shuttle traffic thereon in the same direction (e.g., the first lateral direction 21), the plurality of inter-aisle shuttle outlet tracks 120 may function as parallel passing lanes between which an exemplary shuttle 50 may be transferred in order to facilitate shuttle engagement with each of a plurality of lifts 200 of the AS/RS 1 via the lift interface positions defined along the first inter-aisle shuttle outlet track 121, while simultaneously enabling an at least substantially continuous shuttle traffic flow of at least a portion of the plurality of shuttles 50 travelling from the storage aisle 100 (e.g., the second aisle end 112) to the shuttle transport track 130. The plurality of inter-aisle shuttle outlet tracks 120 may be configured such that a shuttle 50 travelling there along may be selectively transferred between the first inter-aisle shuttle outlet track 121 and the second inter-aisle shuttle outlet track 122 (e.g., from the first inter-aisle shuttle outlet track 121 to the second inter-aisle shuttle outlet track 122 and/or from the second inter-aisle shuttle outlet track 122 to the first inter-aisle shuttle outlet track 121) in order to avoid a shuttle interference that is detected along one of the plurality of inter-aisle shuttle outlet tracks 120. For example, the parallel passing lanes defined by the configuration of the plurality of inter-aisle shuttle outlet tracks 120 enables the plurality of shuttles 50 provided within the rack arrangement level 10 to access each of the plurality of lifts 200 for executing various storage and/or retrieval operations, while avoiding shuttle traffic bottlenecks that impede the shuttle recirculation traffic flow pattern during the use of one or more of the lifts 200 by using the passing lane configuration of the second inter-aisle shuttle outlet track 122 to facilitate the at least substantially continuous flow of shuttle traffic along the plurality of inter-aisle shuttle outlet tracks 120.

Figure 5:
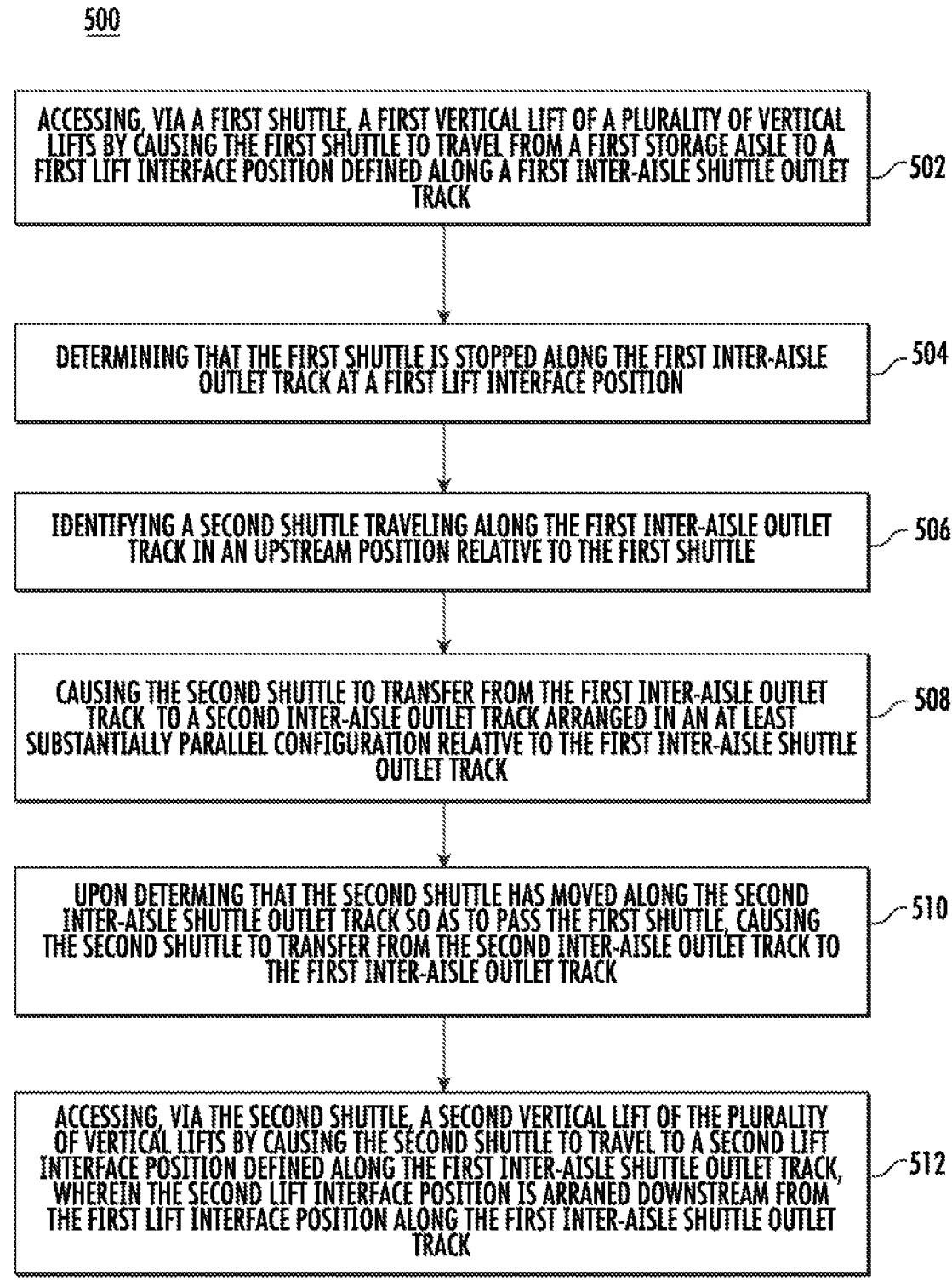
FIG. 5 is a flowchart of operating the automated storage and retrieval system in accordance with an example embodiment.

As a non-limiting example, FIG. 5 is a flowchart that illustrates an exemplary operation of an automated storage and retrieval system using a unidirectional shuttle traffic flow pattern and a plurality of parallel inter-aisle shuttle outlet tracks, such described herein in reference to FIGS. 1-3B, in accordance with various embodiments. Referring to Block 502 of FIG. 5, the exemplary method 500 of operating the automated storage and retrieval system 1 includes accessing, via a first shuttle, a first vertical lift of a plurality of vertical lifts by causing the first shuttle to travel from a first storage aisle to a first lift interface position defined along a first inter-aisle shuttle outlet track. Referring now to Block 504 of FIG. 5, the method 500 of operating the AS/RS 1 includes determining that the first shuttle is stopped along the first inter-aisle outlet track at a first lift interface position. Referring now to Block 506, the method 500 further includes identifying a second shuttle traveling along the first inter-aisle outlet track in an upstream position from the first shuttle relative to the unidirectional shuttle traffic flow pattern of the first inter-aisle outlet track. The method 500 may further include causing the second shuttle to transfer from the first inter-aisle outlet track to a second inter-aisle outlet track arranged in an at least substantially parallel configuration relative to the first inter-aisle shuttle outlet track, as shown at Block 508. Referring now to Block 510, the method 500 of operating the AS/RS 1 may include, upon determining that the second shuttle has moved along the second inter-aisle shuttle outlet track so as to pass the first shuttle, causing the second shuttle to transfer from the second inter-aisle outlet track to the first inter-aisle outlet track. Further, the method 500 may include accessing, via the second shuttle, a second vertical lift of the plurality of vertical lifts by causing the second shuttle to travel to a second lift interface position defined along the first inter-aisle shuttle outlet track, wherein the second lift interface position is arranged downstream from the first lift interface position along the first inter-aisle shuttle outlet track, as shown at Block 512.

Although the plurality of inter-aisle shuttle outlet tracks 120 shown in the exemplary embodiment depicted in FIG. 1 comprises two inter-aisle shuttle outlet tracks (e.g., the first inter-aisle shuttle outlet track 121 and the second inter-aisle shuttle outlet track 122), it should be understood that the plurality of inter-aisle shuttle outlet tracks 120 may comprise at least substantially more than two inter-aisle shuttle outlet tracks arranged in an at least substantially parallel configuration so as to embody parallel passing lanes. As a non-limiting example, in various embodiments, the plurality of inter-aisle shuttle outlet tracks 120 may comprise three, four, five, seven, ten, or any number of inter-aisle shuttle outlet tracks sufficient to facilitate the operability of the AS/RS described herein.

Further, in various embodiments, the selective transfer of a shuttle 50 between the plurality of inter-aisle shuttle outlet tracks 120 (e.g., from the first inter-aisle shuttle outlet track 121 to the second inter-aisle shuttle outlet track 122, or from the second inter-aisle shuttle outlet track 122 to the first inter-aisle shuttle outlet track 121) may be enabled by one or more transfer tracks extending between the first inter-aisle shuttle outlet track 121 and the second inter-aisle shuttle outlet track 122. For example, in various embodiments, one or more of the transfer tracks 201a, 201b may enable a bidirectional traffic flow therethrough, such that a shuttle 50 traveling along the plurality of inter-aisle shuttle outlet tracks 120 may be transferred in either a first transfer direction from the first inter-aisle shuttle outlet track 121 to the second inter-aisle shuttle outlet track 122, or a second transfer direction from the second inter-aisle shuttle outlet track 122 to the first inter-aisle shuttle outlet track 121. In various embodiments, the one or more transfer tracks 201a, 201b may be defined within the plurality inter-aisle shuttle outlet tracks 120, as illustrated in the exemplary rack arrangement level 10 shown in FIG. 1. Alternatively, or additionally, as illustrated in the exemplary rack arrangement level 20 shown in FIG. 2, the one or more transfer tracks 201a, 201b may comprise distinct shuttle track guide segments extending in an at least partially perpendicular direction between the first and second inter-aisle shuttle outlet tracks 121, 122.

In various embodiments, as further illustrated in FIG. 1, the plurality of shuttle guide tracks provided within an exemplary rack arrangement level 10 of an AS/RS 1 may include a shuttle transport track 130 extending between the plurality of inter-aisle shuttle outlet tracks 120 and the inter-aisle shuttle inlet track 140 so as to facilitate transportation of the plurality of shuttles 50 from the plurality of inter-aisle shuttle outlet tracks 120 to the inter-aisle shuttle inlet track 140. In various embodiments, the shuttle transport track 130 may be defined at least in part by a track length that extends between a first track end connected to one or more of the plurality of inter-aisle shuttle outlet tracks 120 and a second track end connected to the inter-aisle shuttle inlet track 140. For example, as illustrated, an exemplary shuttle transport track 130 may be configured to enable shuttle traffic along the track length thereof so as to define a portion of a looped track circuit and facilitate a shuttle recirculation traffic flow pattern relative to one or more storage aisles 100 provided within a given rack arrangement level 10 of an AS/RS 1. As described herein, the shuttle transport track 130 is configured to define a unidirectional shuttle traffic flow pattern along the track length thereof. For example, the shuttle transport track 130 may be configured such that exemplary shuttles 50 travelling along the shuttle transport track 130 (e.g., from the plurality of inter-aisle shuttle outlet tracks 120 to the inter-aisle shuttle inlet track 140) may move in a second longitudinal direction 12. As illustrated, the second longitudinal direction 12 may be defined by a longitudinal direction that is at least partially opposite the first longitudinal direction 11 defined by the aisle track 110 of a storage aisle 100, such as, for example, in the positive-y direction, as illustrated. For example, as shown, the shuttle transport track 130 may be configured to facilitate movement of a shuttle 50 there along in the second longitudinal direction 21 in order to direct the movement of the shuttle 50 received from the plurality of inter-aisle shuttle outlet tracks 120 towards the first aisle end 111 of the aisle track 110 of storage aisle 100 (e.g., towards the inter-aisle shuttle inlet track 140).

Further, the plurality of shuttle guide tracks provided within an exemplary rack arrangement level 10 of an AS/RS 1 may include an inter-aisle shuttle inlet track 140 extending between the shuttle transport track 130 and a first aisle end 111 of the aisle rack 110 of each of the storage aisles 100 defined within the rack arrangement level 10. The inter-aisle shuttle inlet track 140 is configured to operatively connect the shuttle transport track 130 to aisle track 110 of a storage aisle 100 (e.g., the first aisle end 111) in order to facilitate transportation of the plurality of shuttles 50 from shuttle transport track 130 to the aisle track 110 of a particular storage aisle 100. In various embodiments, the inter-aisle shuttle inlet track 140 may be defined at least in part by a track length that extends between a first track end connected to the shuttle transport track 130 and a second track end connected to the first aisle end 111 of an aisle track 110 defining part of a storage aisle 100. For example, as illustrated, an exemplary inter-aisle shuttle inlet track 140 may be configured to enable shuttle traffic along the track length thereof so as to define a portion of a looped track circuit, as described herein, and facilitate a shuttle recirculation traffic flow pattern relative to one or more storage aisles 100 provided within a given rack arrangement level 10 of an AS/RS 1. For example, the inter-aisle shuttle inlet track 140 may be arranged so as to extend in a direction that at least substantially intersects a first aisle end 111 of each of the storage aisles 100 provided within a rack arrangement level 10 (e.g., in an at least substantially a perpendicular direction relative to the aisle length). Accordingly, in various embodiments, the inter-aisle shuttle inlet track 140 may be at least substantially immediately upstream from each of the aisle track 110 provided within the rack arrangement level 10 such that a corresponding storage aisle 100 may selectively be accessed by a shuttle 50 via the inter-aisle shuttle inlet track 140. As described herein, the inter-aisle shuttle inlet track 140 is configured to define a unidirectional shuttle traffic flow pattern along the track length thereof. For example, the inter-aisle shuttle inlet track 140 may be configured such that exemplary shuttles 50 travelling along the inter-aisle shuttle inlet track 140 (e.g., from the shuttle transport track 130 to an aisle track 110 of a particular storage aisle 100) may move in a second lateral direction 22. As illustrated, the second lateral direction 22 may be defined by a lateral direction that is at least partially opposite the first lateral direction 21 defined by the plurality of inter-aisle shuttle outlet tracks 120, such as, for example, the positive-x direction, as illustrated. For example, as shown, the inter-aisle shuttle inlet track 140 may be configured to facilitate movement of a shuttle 50 there along in the second lateral direction 22 in order to direct the movement of the shuttle 50 received from the shuttle transport track 130 towards a first aisle end 111 of an aisle track 110 of storage aisle 100. For example, a shuttle 50 travelling along the inter-aisle shuttle inlet track 140 in the second lateral direction 22 according to the unidirectional shuttle traffic flow pattern thereof may be directed to one or more positions along the track length of the inter-aisle shuttle inlet track 140 that are connected to a first aisle end 111 of an aisle track 110, such that the shuttle 50 may access the corresponding storage aisle 100 therefrom. The aisle track 110 of each storage aisle 100 may be configured to receive a shuttle 50 transferred thereto from the inter-aisle shuttle inlet track 140 such that movement of the shuttle 50 is redirected from the second lateral direction 22 to the first longitudinal direction 11 as the shuttle 50 travels along the aisle track 110.

Figure 2:
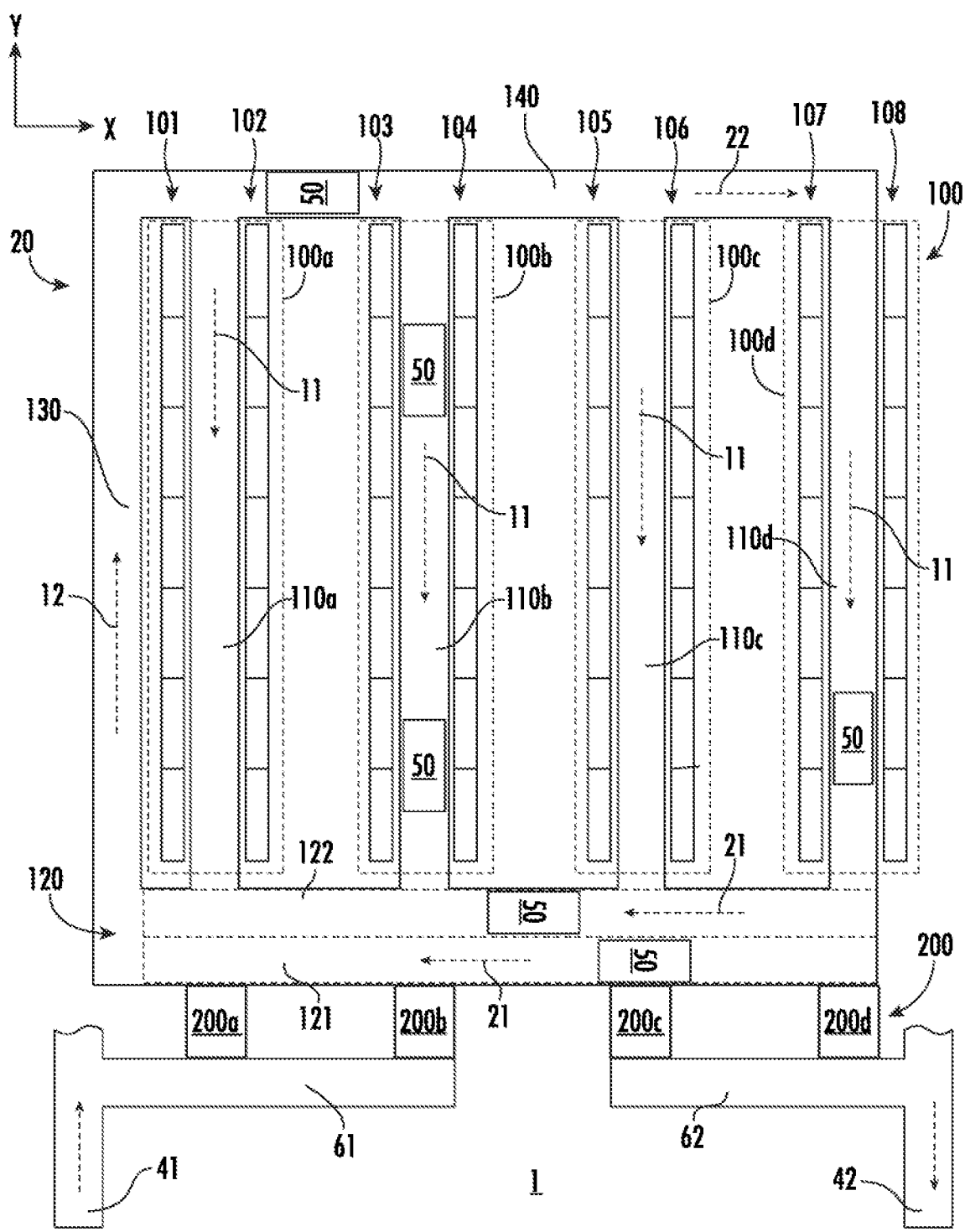
FIG. 2 illustrates a schematic view of an exemplary automated storage and retrieval system according to various embodiments described herein.

FIG. 2 illustrates a schematic view of an exemplary automated storage and retrieval system according to various embodiments described herein. In particular, FIG. 2 illustrates a schematic view of an exemplary rack arrangement level 10 of an AS/RS 1, the rack arrangement level 10 comprising a plurality of storage aisles 100. In various embodiments, the rack arrangement of an exemplary AS/RS 1 may comprise a plurality of storage racks arranged so as to define a plurality of adjacent storage rack pairs, each adjacent storage rack pair defining a central aisle provided between the adjacent storage racks, as described herein. In such an exemplary circumstance, as shown in the exemplary embodiment illustrated in FIG. 2, an exemplary rack arrangement level 20 may comprise a plurality of storage aisles 100 provided therein, each of which may be accessible to a shuttle 50 configured traveling along the plurality of shuttle guide tracks within the rack arrangement level 20 according to the shuttle recirculation traffic flow pattern, as described herein. For example, the exemplary rack arrangement level 20 illustrated in FIG. 2 includes a plurality of storage aisle 100 comprising a first storage aisle 100a, a second storage aisle 100b, a third storage aisle 100c, and a fourth storage aisle 100d. In various embodiments, each of the plurality of storage aisles 100 within a rack arrangement level 20 may comprise a first storage shelf and a second storage shelf of adjacent storage racks, respectively. In the illustrated exemplary embodiment, the first storage aisle 100a comprises a first storage shelf 101 and a second storage shelf 102, the second storage aisle 100b comprises a third storage shelf 103 and a fourth storage shelf 104, the third storage aisle 100c comprises a fifth storage shelf 105 and a sixth storage shelf 106, and the fourth storage aisle 100d comprises a seventh storage shelf 107 and an eight storage shelf 108. Further, the first, second, third, and fourth storage aisles 100a, 100b, 100c, and 100d of the plurality of storage aisles 100 provided in the rack arrangement level 20 may comprise a first aisle track 110a, a second aisle track 110b, a third aisle track 110c, and a fourth aisle track 110d, respectively, each of which may extend along a respective aisle length between the two storage shelves of the corresponding storage aisle in at least substantially the same longitudinal direction as the storage shelves provided on either side thereof.

In various embodiments, the rack arrangement of the AS/RS 1 may comprise a plurality of racks provided in a laterally distributed arrangement wherein each of the plurality of racks is arranged in an at least substantially parallel configuration relative to one another, such that each of the respective storage shelves provided within the rack arrangement level 20 (e.g., first storage shelf 101, second storage shelf 102, third storage shelf 103, fourth storage shelf 104, fifth storage shelf 105, sixth storage shelf 106, seventh storage shelf 107, eighth storage shelf 108) are similarly arranged in an at least substantially parallel configuration relative to one another. Accordingly the storage aisles of the plurality of storage aisles 100 may be arranged in a parallel configuration, wherein the aisle length of each of the plurality of storage aisles 100 is parallel to each of the other aisle lengths defined by the other storage aisles of the plurality 100. For example, as illustrated in FIG. 2, the first, second, third, and fourth storage aisles 100a, 100b, 100c, 100d may each extend in an at least substantially longitudinal direction, such as, for example, in the y-direction, as illustrated.

In various embodiments, an exemplary rack arrangement level 20 may be configured such that each of the plurality of storage aisles 100 provided within the rack arrangement level 20 may comprise a respective aisle track 110a, 110b, 110c, 110d that extends along an aisle length thereof in a longitudinal direction that is at least substantially parallel to the adjacent storage shelves of the corresponding storage aisle. As illustrated in FIG. 2, the aisle tracks 110a, 110b, 110c, 110d of each of the plurality of storage aisles 100a, 100b, 100c, 100d may be configured to enable shuttle traffic of at least one shuttle provided within the storage aisle along the aisle length thereof in a first shuttle travel direction in order to facilitate movement of one or more of the plurality of automated shuttles 50 to and/or from one or more storage locations provided within the storage aisle 100. For example, as illustrated, each of the aisle tracks 110a, 110b, 110c, 110d are configured to enable shuttle traffic of at least one shuttle 50 along the respective aisle length thereof in a first shuttle travel direction, such as, for example, the first longitudinal direction 11 (e.g., in the negative-x direction, as illustrated). In various embodiments, each of the plurality of storage aisles 100 provided within a rack arrangement level 20 may be configured to facilitate shuttle transportation along a corresponding aisle track thereof (e.g., aisle tracks 110a, 110b, 110c, 110d) according to a unidirectional shuttle traffic flow pattern, wherein the unidirectional shuttle traffic flow pattern is defined by the movement of each of the plurality of shuttles 50 along the corresponding aisle track thereof in at least substantially the same shuttle travel direction, such as, for example, in the first longitudinal direction 11.

In various embodiments, an exemplary rack arrangement level 20 comprising a plurality of storage aisles 100 provided therein may comprise a plurality of inter-aisle shuttle outlet tracks 120, as described herein, that extends in a direction is at least substantially perpendicular to at least a portion of the parallelly-configured plurality of storage aisles 100 (e.g., in a lateral direction, such as the x-direction, as illustrated) and is arranged so as to be connected to each of the plurality of storage aisles 100 (e.g., at the second aisle end of each respective aisle track). Accordingly, in various embodiments, the plurality of inter-aisle shuttle outlet tracks 120 may comprise a second inter-aisle shuttle outlet track 122 that is at least substantially immediately downstream from each of the plurality of storage aisles 100 within the rack arrangement level 20 such that a plurality of shuttles 50 travelling along any one of the aisle tracks 110a, 110b, 110c, 110d according to the unidirectional shuttle traffic flow pattern defined by each of the plurality of storage aisles 100, as described herein, may be received by the second inter-aisle shuttle outlet track 122 upon plurality of shuttles 50 being transported beyond the second aisle end of the aisle track of a storage aisle 100. Further, the first inter-aisle shuttle outlet track 121 of the plurality of inter-aisle shuttle outlet tracks 120 may be configured to facilitate transportation of the plurality of shuttles 50 from each of the plurality of storage aisles 100 provided within the rack arrangement level 20 to one or more of a plurality of vertical lifts 200 of the AS/RS 1. For example, the first inter-aisle shuttle outlet track 121 may define a vertical lift access track along which a plurality of shuttles 50 may be received from at least one of the plurality of storage aisles 100 (e.g., 100a, 100b, 100c, 100d) and transported according to a unidirectional shuttle traffic flow pattern in a first latitude direction 12 (e.g., in the negative-x direction, as illustrated) to one of a plurality of lift interface positions defined along the first inter-aisle shuttle outlet track 121, as described herein, from which a shuttle 50 may access an adjacent lift 200a, 200b, 200c, 200d of the plurality of lifts 200.

As described herein in further detail in reference to the plurality of inter-aisle shuttle outlet tracks 120 of the exemplary rack arrangement level 10 depicted in FIG. 1, the plurality of inter-aisle shuttle outlet tracks 120 configured to facilitate transportation of the plurality of shuttles 50 from the plurality of storage aisles 100 to one or more of the plurality of lifts 200, or, alternatively and/or additionally, to the shuttle transport track 130 as the result of the shuttle recirculation traffic flow pattern defined within the rack arrangement level 20. For example, of the first inter-aisle shuttle outlet track 121 and the second inter-aisle shuttle outlet track 122 may be configured to facilitate a respective unidirectional shuttle traffic flow pattern defined at least in part along a respective track length thereof in the first lateral direction 21 (e.g., the negative-x direction, as illustrated). As described herein, the second inter-aisle shuttle outlet track 122 spans laterally across each of the plurality of storage aisles 100 provided within the rack arrangement system 20, and is arranged in an at least substantially parallel and adjacent configuration relative to the first inter-aisle shuttle outlet track 121 such that the second inter-aisle shuttle outlet track 122 embodies a parallel passing track that functions as an alternative shuttle travel path to that of the first inter-aisle shuttle outlet track 121. The plurality of inter-aisle shuttle outlet tracks 120 may be configured such that a shuttle 50 travelling there along may be selectively transferred between the first inter-aisle shuttle outlet track 121 and the second inter-aisle shuttle outlet track 122 in order to facilitate an at least substantially continuous (e.g., unobstructed) shuttle traffic flow towards the shuttle transport track 130. Further, an exemplary second inter-aisle shuttle outlet track 122 embodying a parallel passing track may be utilized for transportation of at least a portion of the plurality of shuttles 50 determined to be executing a portion of a storage and/or retrieval operation that does not require access to one of the plurality of lifts 200. For example, such exemplary shuttles 50 may be transported along the second inter-aisle shuttle outlet track 122 directly to the shuttle transport track 130 without being transferred to the first inter-aisle shuttle outlet track 121, thereby minimizing the risk that the movement of said exemplary shuttles 50 along the plurality of inter-aisle shuttle outlet tracks 120 will be impeded and/or slowed by another shuttle 50 of the plurality that is stopped at a lift interface position along the first inter-aisle shuttle outlet track 121.

As further illustrated in FIG. 2, an exemplary rack arrangement level 20 comprising a plurality of storage aisles 100 provided therein may comprise an inter-aisle shuttle inlet track 140, as described herein, that extends in a direction is at least substantially perpendicular to at least a portion of the parallelly-configured plurality of storage aisles 100 (e.g., in a lateral direction, such as the x-direction, as illustrated) and is arranged so as to be connected to each of the plurality of storage aisles 100 (e.g., at the first aisle end of each respective aisle track). The inter-aisle shuttle inlet track 140 may be configured to operatively connect the shuttle transport track 130 to each of the plurality of storage aisles 100a, 100b, 100c, 100d (e.g., each of the respective aisle tracks 110a, 110b, 110c, 110d) at a respective first aisle end thereof in order to facilitate transportation of the plurality of shuttles 50 from shuttle transport track 130 to a particular storage aisle of the plurality of storage aisles 100. In various embodiments, the inter-aisle shuttle inlet track 140 may be defined at least in part by a track length that extends between a first track end connected to the shuttle transport track 130 and a second track end operatively connected to first aisle end of the storage aisle of the plurality 100 that is arranged in a position farthest away from the shuttle transport track 130, such as, for example, the fourth storage aisle 100d in the exemplary rack arrangement 20 illustrated in FIG. 2. Accordingly, in various embodiments, the inter-aisle shuttle inlet track 140 may be arranged at least substantially immediately upstream (e.g., relative to the shuttle recirculation traffic flow pattern, as described herein) from each of the aisle tracks 110a, 110b, 110c, 110d provided within the rack arrangement level 20 such that one or more shuttles 50 instructed (e.g., via a central controller of the AS/RS 1) to execute a storage and/or retrieval operation with respect to an object stored at a storage location provided within a particular storage aisle of the plurality 100 may travel along the inter-aisle shuttle inlet track 140 in the second lateral direction 22 according to the unidirectional shuttle traffic flow pattern thereof to a position at least substantially adjacent a first aisle end of the particular storage aisle, where the one or more shuttles 50 may turn into the particular storage aisle comprising the designated storage location.

In various embodiments, the plurality of vertical lifts 200 of an exemplary AS/RS 1 may include a first portion of the plurality of vertical lifts 200 may be operatively connected to a first conveyor configured to transport objects between the AS/RS 1 and a first remote location, and a second portion of the plurality of vertical lifts 200 may be operatively connected to a second conveyor configured to transport objects between the AS/RS 1 and a second remote location. For example, as illustrated, the plurality of vertical lifts 200 may comprise a first portion of the plurality of vertical lifts 200 including a first vertical lift 200a and a second vertical lift 200b that are operatively connected to a first conveyor 61 that is configured to transport objects between the AS/RS 1 and a first remote conveyor 41. As illustrated, the plurality of vertical lifts 200 may further include a second portion of vertical lifts including a third vertical lift 200c and a third vertical lift 200d that are operatively connected to a second conveyor 62 that is configured to transport objects between the AS/RS 1 and a second remote conveyor 42. In such an exemplary circumstance, one or more shuttles of the plurality of shuttles 50 instructed to execute a storage and/or retrieval operation that requires accessing either the first vertical lift 200a or the second vertical lift 200b may be selectively transported along the second inter-aisle shuttle outlet track 122 in the first lateral direction 21 so as to pass the lift interface positions corresponding to the third vertical lift 200c and the fourth vertical lift 200d. The one or more shuttles 50 may be selectively transferred from the second inter-aisle shuttle outlet track 122 to the first inter-aisle shuttle outlet track 121 so as to avoid track interferences caused by other shuttles of the plurality 50 being positioned in the lift interface positions corresponding to the third vertical lift 200c and the fourth vertical lift 200d, while facilitating the transportation of the one or more shuttles to a particular one of the designated vertical lifts 200a, 200b.

Similarly, in an exemplary circumstance wherein a shuttle 50 is executing a storage and/or retrieval operation that requires the shuttle 50 to access a particular lift of the plurality of lifts 200, such as, for example, the fourth lift 200d, the shuttle 50 may be selectively transported along the inter-aisle shuttle inlet track 140 to a particular storage aisle of the plurality of storage aisles 100, such as, for example, the fourth storage aisle 100d, that defines a portion of the shuttle recirculation traffic flow pattern defined within the rack arrangement level 20 that is in an upstream position relative to the lift interface position corresponding to the particular vertical lift to be accessed (e.g., the fourth lift 200d).

In various embodiments, the plurality of shuttles provided within a rack arrangement level of an exemplary AS/RS may include one or more shuttles that are at least temporarily in a standby configuration wherein the one or more shuttles are not being used to execute a storage and/or retrieval operation at a given time. [[[For example, an exemplary AS/RS may comprise a central controller that is in communication with each of the plurality of shuttles 50 and configured to determine an optimal number of shuttles of the plurality 50 to be used in operation within a particular rack arrangement level at a given time based at least in part on an identified and/or estimated bandwidth of the AS/RS 1 (e.g., within the particular rack arrangement level at that time. For example, in various embodiments, the central controller of the AS/RS may identify that less than the total number of shuttles 50 in the plurality of shuttles provided at a rack arrangement level is needed to execute one or more storage and/or retrieval operations, and therefore, may cause at least a portion of the plurality of shuttles 50 to be transported to a shuttle storage position defined along a portion of the shuttle travel racks of the rack arrangement level. Further, in various embodiments, the central controller of the AS/RS may identify that the number of shuttles needed to execute one or more storage and/or retrieval operations is more than the total number of shuttles of the plurality 50 in operation at a given time, and therefore, may cause one or more shuttles of the plurality 50 that are being stored in a shuttle storage position within the rack level arrangement to be dispatched from the shuttle storage position for use in a storage and/or retrieval operation.

Figure 3A:
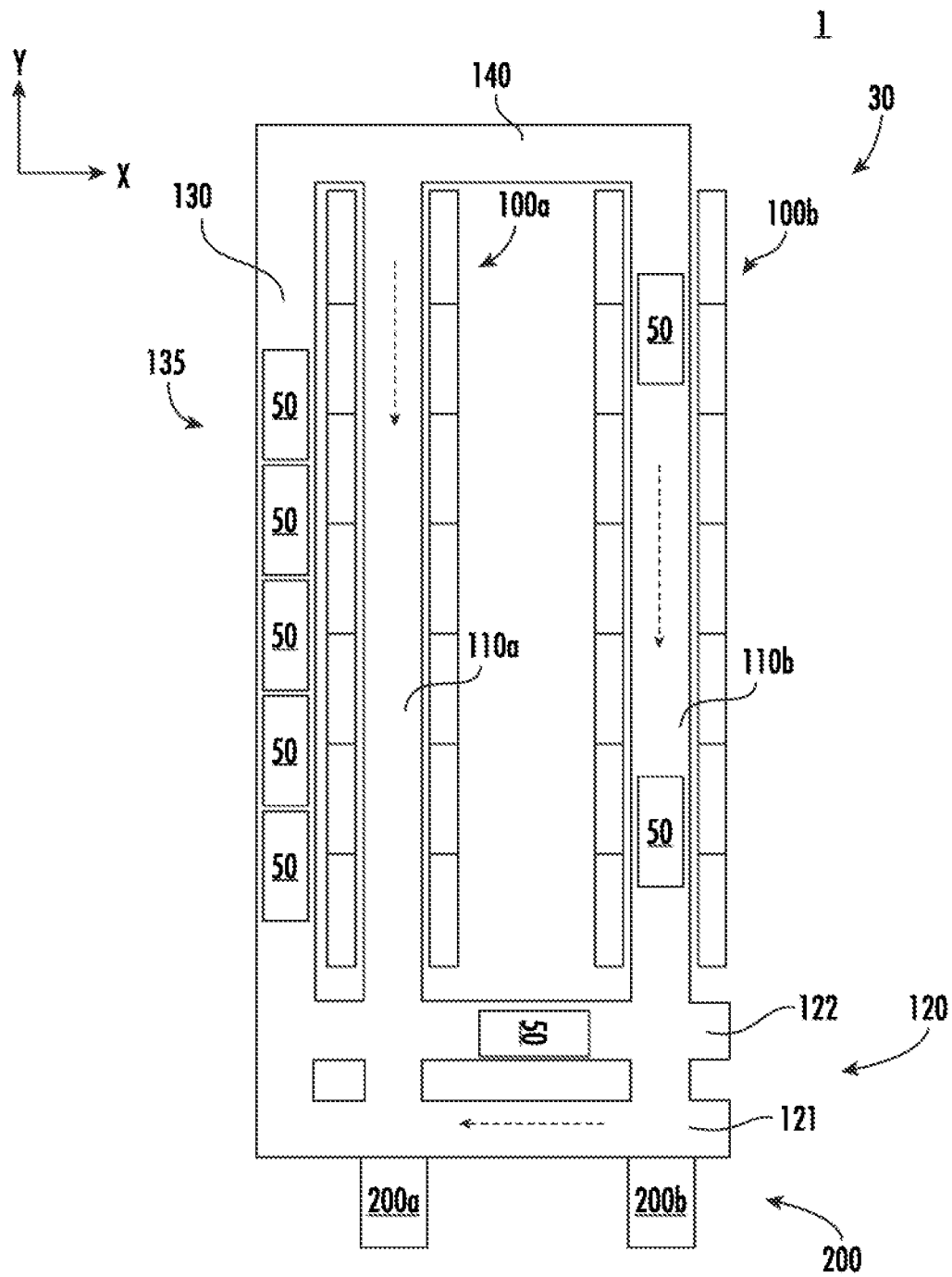
FIGS. 3A-3B illustrate various schematic views of exemplary automated storage and retrieval systems according to various embodiments described herein.
Figure 3B:
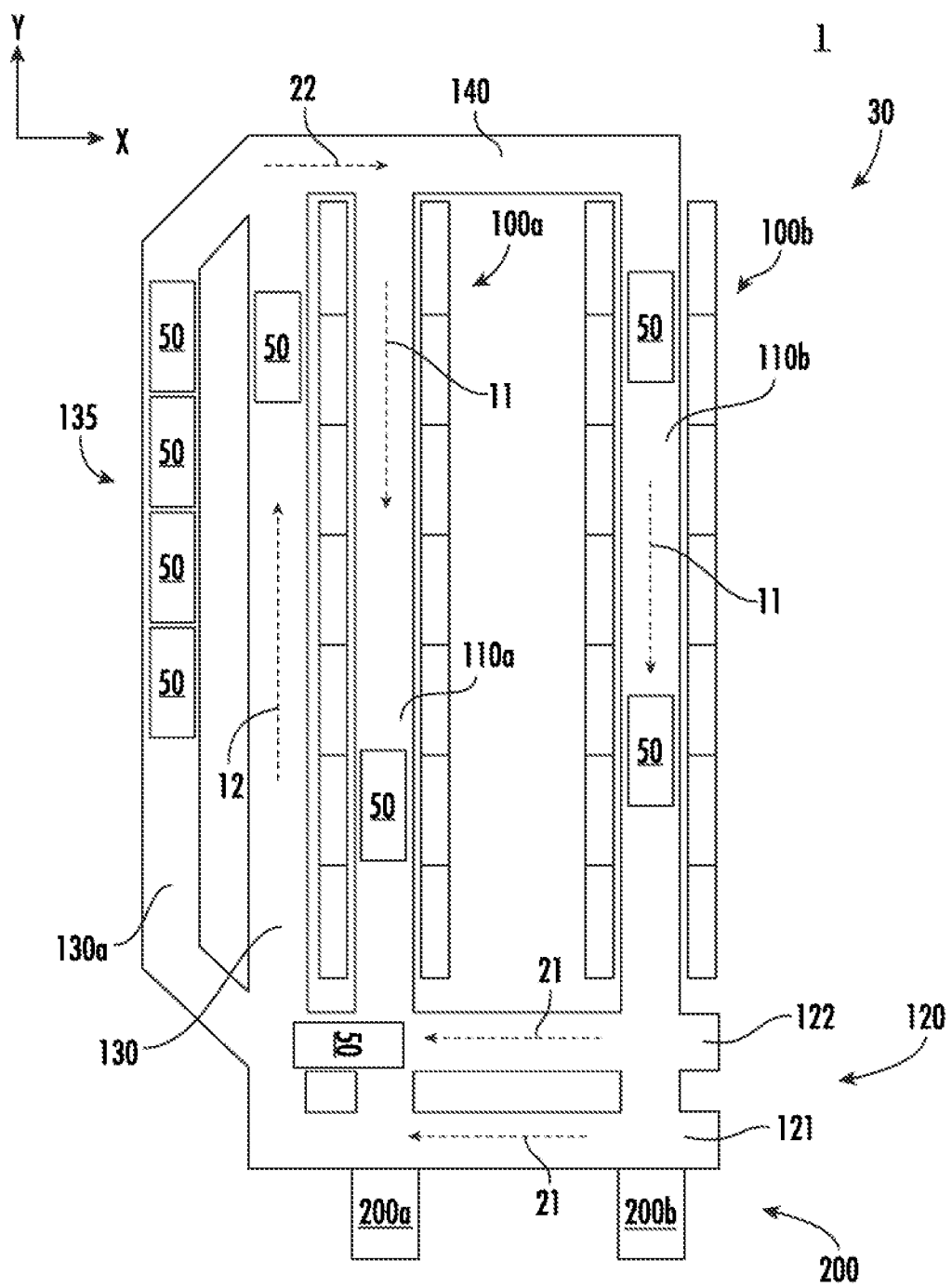

FIGS. 3A-3B illustrate various schematic views of exemplary automated storage and retrieval systems that include rack arrangement levels comprising a shuttle storage position according to various embodiments described herein. As illustrated in FIG. 3A, in various embodiments an exemplary rack arrangement level 30 may comprise a shuttle storage position 135 that is defined along the shuttle transport track 130 thereof. For example, at least a portion of the plurality of shuttles 50 provided within the rack arrangement level 30 may be at least temporarily stored at a shuttle storage position 135 defined along at least a portion of the track length of the shuttle transport track 130. The at least a portion of the plurality of shuttles 50 being stored at the shuttle storage position 135 along the shuttle transport track 130 may be positioned in a serial arrangement along the track length thereof so as to define a queue of shuttles 50 that are not executing a storage and/or retrieval operation at a given time. In various embodiments, one or more shuttles 50 may be dispatched from the shuttle storage position as needed to execute one or more storage and/or retrieval operations. In such an exemplary circumstance, a central controller of the AS/RS 1 may provide instructions to at least the shuttle positioned in a frontmost position (e.g., furthest downstream, as defined along the unidirectional shuttle traffic flow) within the shuttle storage position 135 that may cause the shuttle to be transported (e.g., dispatched) from the shuttle storage position 135 to a designated storage aisle of the plurality 100 (e.g., via the inter-aisle shuttle inlet track 140). For example, upon successfully executing the storage and/or retrieval operation, the shuttle 50 may be transported to the shuttle transport track 130 (e.g., via the plurality of inter-aisle shuttle outlet tracks 120) such that it may returned to the shuttle storage position 135. Such an exemplary shuttle 50 may be returned to the shuttle storage position 135 such that it is arranged in a back-most position in the queue of shuttles 50 provided within the shuttle storage position 135.

As a further non-limiting example, FIG. 3B illustrates an exemplary rack arrangement level 30 comprising a shuttle storage position 135 that is defined along a secondary shuttle transport track 130a. In various embodiments, an exemplary rack arrangement level 30 may comprise a shuttle transport track 130, as described herein in further detail with respect to FIGS. 1 and 2, and a secondary shuttle transport track 130a along which at least a portion of the plurality of shuttles 50 provided within the rack arrangement level 30 may be at least temporarily stored at a shuttle storage position 135. For example, the at least a portion of the plurality of shuttles 50 being stored along the secondary shuttle transport track 130a may be positioned in a serial arrangement along the track length of the secondary shuttle transport track 130a so as to define a queue of shuttles 50 that are not executing a storage and/or retrieval operation at a given time. The secondary shuttle transport track 130a may comprise a distinct segment of shuttle guide track that is at least substantially separate from the shuttle transport track 130 such that the shuttles 50 provided at the shuttle storage position 135 along the secondary shuttle transport track 130a do not interrupt, interfere with, and/or otherwise obstruct the shuttle recirculation traffic flow pattern defined in part by the shuttle transportation track 130. In various embodiments, upon determining that an additional shuttle 50 is required in order to execute a storage and/or retrieval operation, a central controller of the AS/RS 1 may provide instructions to the shuttle positioned in a frontmost position (e.g., furthest downstream, as defined along the unidirectional shuttle traffic flow) within the shuttle storage position 135 that may cause the shuttle to be transported (e.g., dispatched) from the shuttle storage position 135 to a designated storage aisle of the plurality 100 (e.g., via the inter-aisle shuttle inlet track 140).

Figure 4:
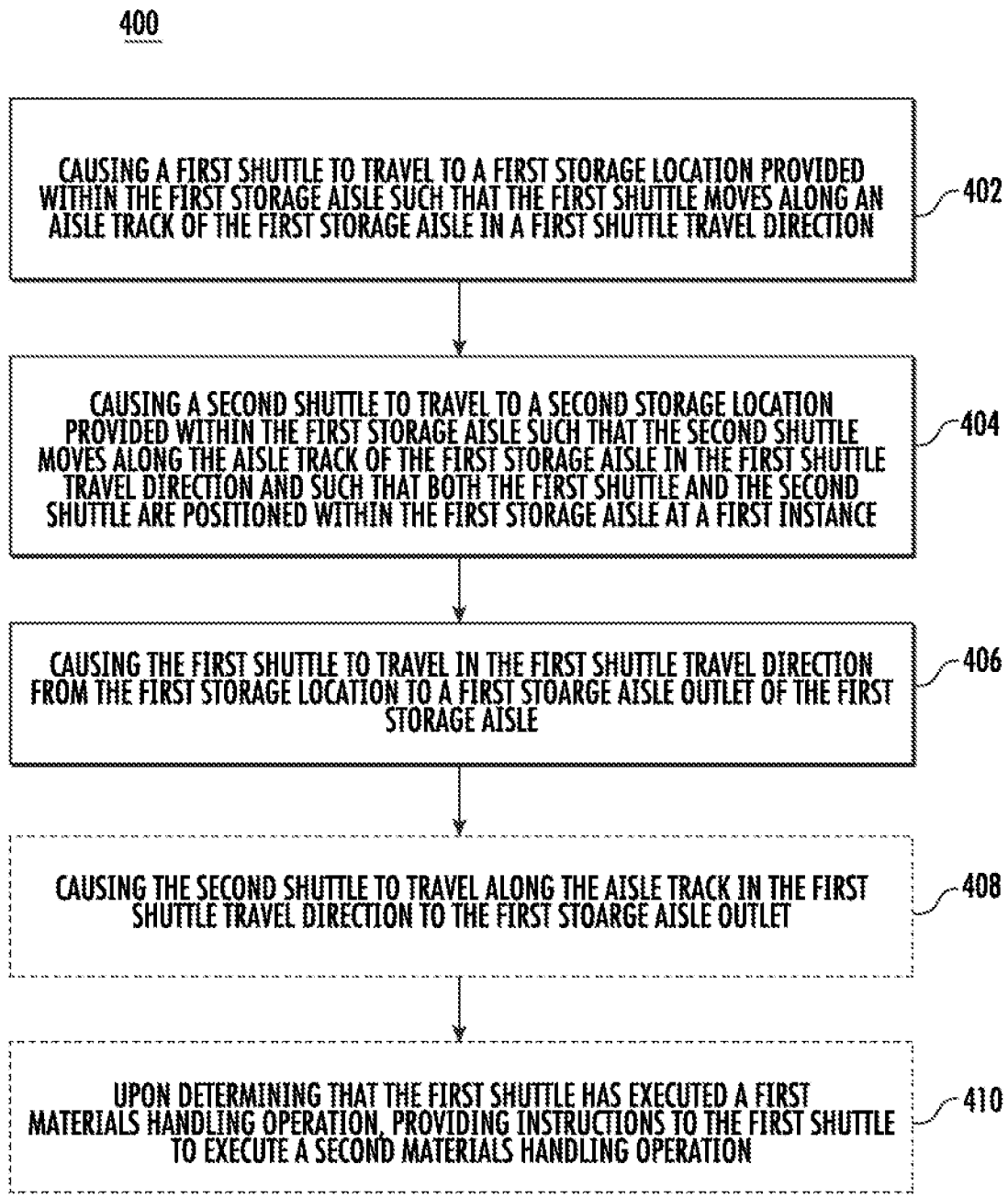
FIG. 4 is a flowchart of operating an automated storage and retrieval system in accordance with an example embodiment.

FIG. 4 is a flowchart that illustrates an exemplary operation of an automated storage and retrieval system using a unidirectional shuttle traffic flow pattern, such described herein in reference to FIGS. 1-3B, in accordance with various embodiments. Referring to Block 402 of FIG. 4, the exemplary method 400 of operating the automated storage and retrieval system 1 includes causing a first shuttle to travel to a first storage location provided within the first storage aisle such that the first shuttle moves along an aisle track of the first storage aisle in a first shuttle travel direction. In various embodiments, wherein the AS/RS 1 comprises a plurality of storage aisles, causing a first shuttle to travel to a first storage location provided within the first storage aisle may comprise selectively causing the first shuttle to travel to a storage location within the first storage aisle from the plurality of storage aisles based at least in part on a relative position of the first storage aisle within a unidirectional shuttle recirculation traffic flow pattern defined by the automated storage and retrieval system. Referring now to Block 404 of FIG. 4, the method 400 of operating the AS/RS 1 includes causing a second shuttle to travel to a second storage location provided within the first storage aisle such that the second shuttle moves along the aisle track of the first storage aisle in the first shuttle travel direction and such that both the first shuttle and the second shuttle are positioned within the first storage aisle at a first instance. As described herein, the unidirectional shuttle traffic flow pattern defined by the first storage aisle enables an operation wherein the first shuttle executing a first materials handling operation and the second shuttle executing a second materials handling operation may each be positioned along the aisle track of the first storage aisle at the same time by eliminating the possibility that two shuttles simultaneously positioned within the same storage aisle are executing instructions to move in opposing directions and/or along conflicting shuttle traffic paths. Referring now to Block 406 of FIG. 4, the method 400 of operating the AS/RS 1 includes causing the first shuttle to travel in the first shuttle travel direction from the first storage location to a first storage aisle outlet of the first storage aisle. Further, in reference to Block 408 of FIG. 4, the method 400 of operating the AS/RS 1 may include causing the second shuttle to travel along the aisle track in the first shuttle travel direction to the first storage aisle outlet. As illustrated in the exemplary embodiment shown in FIG. 1, the first storage aisle outlet of the first storage aisle 100 may be defined by the second aisle end 112. Further, in various embodiments, the method 400 of operating the AS/RS 1 may include, upon determining that that the first shuttle has executed a first materials handling operation, providing instructions to the first shuttle to execute a second materials handling operation, as shown at Block 410 of FIG. 4. In various embodiments, providing instructions to the first shuttle to execute the second materials handling operation may comprise causing the first shuttle to travel to a third storage location provided within the first storage aisle such that the first shuttle moves along the aisle track of the first storage aisle in the first shuttle travel direction.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated storage and retrieval system comprising:
   a plurality of storage aisles, each storage aisle comprising a plurality of storage locations positioned adjacent to an aisle track that extends along an aisle length;
   a plurality of shuttles configured to travel throughout the automated storage and retrieval system to execute a materials handling operation;
   at least one vertical lift;
   a plurality of inter-aisle shuttle outlet tracks configured to facilitate shuttle traffic flow in at least substantially the same direction, the plurality of inter-aisle shuttle outlet tracks comprising:
      a first inter-aisle shuttle outlet track configured to facilitate shuttle traffic flow to the at least one vertical lift via at least one lift interface position defined along the first inter-aisle shuttle outlet track; and
      a second inter-aisle shuttle outlet track arranged in an at least substantially parallel configuration relative to the first inter-aisle shuttle outlet track;
      wherein the plurality of inter-aisle shuttle outlet tracks is configured to enable a transfer of at least one of the plurality of shuttles between the first inter-aisle shuttle outlet track and the second inter-aisle shuttle outlet track at one or more transfer locations along the first inter-aisle shuttle outlet track;
   wherein the aisle track of each storage aisle of the plurality of storage aisles is configured to facilitate shuttle traffic flow along the aisle length thereof in a first shuttle travel direction such that each of the plurality of storage aisles is defined in part by a unidirectional shuttle traffic flow pattern.

2. The automated storage and retrieval system of claim 1, further comprising a central controller configured to transmit instructional signals to each of the plurality of shuttles to cause the plurality of shuttles to travel throughout the automated storage and retrieval system.

3. The automated storage and retrieval system of claim 1, wherein the first inter-aisle shuttle outlet track is defined at least in part by a first track length and the second inter-aisle shuttle outlet track is defined at least in part by a second track length that is at least substantially equal to the first track length.

4. The automated storage and retrieval system of claim 1, wherein the plurality of storage aisles is defined by further comprising a rack arrangement comprising a plurality of storage racks, each storage rack being defined by a plurality of storage shelves arranged in a vertically stacked configuration such that the rack arrangement comprises a plurality of rack arrangement levels, wherein each of the plurality of storage aisles is provided within a first rack arrangement level.

5. The automated storage and retrieval system of claim 4, wherein the plurality of storage racks is arranged in an at least substantially parallel configuration such that each of the plurality of storage aisles is parallel to one another.

6. The automated storage and retrieval system of claim 1, comprising a shuttle storage position that is defined by a shuttle guide track segment along which the automated storage and retrieval system is configured to store one or more of the plurality of shuttles that are configured in a standby configuration at a particular instance.

7. The automated storage and retrieval system of claim 6, wherein the shuttle storage position is defined along a secondary shuttle transport track extending at least partially between the plurality of inter-aisle shuttle outlet tracks and an inter-aisle shuttle inlet track operatively connected to each of the plurality of storage aisles.

8. The automated storage and retrieval system of claim 1, further comprising an inter-aisle shuttle inlet track operatively connected to a respective aisle inlet end of each of the plurality of storage aisles such that each of the plurality of storage aisles is accessible to the plurality of shuttles via the inter-aisle shuttle inlet track, wherein the inter-aisle shuttle inlet track is configured to facilitate unidirectional shuttle traffic flow along a shuttle inlet track length thereof.

9. The automated storage and retrieval system of claim 8, further comprising a shuttle transport track extending from the plurality of inter-aisle shuttle outlet tracks to the inter-aisle shuttle inlet track so as to facilitate transportation of the plurality of shuttles from the plurality of inter-aisle shuttle outlet tracks to the inter-aisle shuttle inlet track.

10. The automated storage and retrieval system of claim 9, wherein the automated storage and retrieval system is configured to enable a shuttle recirculation traffic flow pattern defined at least in part by respective unidirectional shuttle traffic flow patterns along each of the shuttle transport track, the inter-aisle shuttle inlet track, the plurality of inter-aisle shuttle outlet tracks, and at least one of the plurality of storage aisles.

11. A method of operating an automated storage and retrieval system using a unidirectional shuttle traffic flow pattern, the method comprising:

providing the automated storage and retrieval system comprising a first storage aisle, the first storage aisle comprising an aisle track extending along an aisle length and a plurality of storage locations positioned at least substantially adjacent the aisle track, wherein the aisle track is configured to facilitate movement of a plurality of shuttles along the first storage aisle in a shuttle travel direction defined along the aisle length;

causing a first shuttle to travel to a first storage location provided within the first storage aisle such that the first shuttle moves along the aisle track of the first storage aisle in a first shuttle travel direction;

causing a second shuttle to travel to a second storage location provided within the first storage aisle such that the second shuttle moves along the aisle track of the first storage aisle in the first shuttle travel direction and such that both the first shuttle and the second shuttle are positioned within the first storage aisle at a first instance; and causing the first shuttle to travel in the first shuttle travel direction from the first storage location to a first storage aisle outlet of the first storage aisle, wherein the automated storage and retrieval system comprises a plurality of inter-aisle shuttle outlet tracks configured to facilitate shuttle traffic flow in at least substantially the same direction, the plurality of inter-aisle shuttle outlet tracks comprising:

a first inter-aisle shuttle outlet track configured to facilitate shuttle traffic flow to at least one vertical lift via at least one lift interface position defined along the first inter-aisle shuttle outlet track; and a second inter-aisle shuttle outlet track arranged in an at least substantially parallel configuration relative to the first inter-aisle shuttle outlet track;

wherein the plurality of inter-aisle shuttle outlet tracks is configured to enable a transfer of at least one of the plurality of shuttles between the first inter-aisle shuttle outlet track and the second inter-aisle shuttle outlet track at one or more transfer locations along the first inter-aisle shuttle outlet track.

12. The method of claim 11, further comprising causing the second shuttle to travel along the aisle track in the first shuttle travel direction to the first storage aisle outlet.

13. The method of claim 11, further comprising accessing, via the first shuttle, a first vertical lift of a plurality of vertical lifts by causing the first shuttle to travel from the first storage aisle to a first lift interface position defined along the first inter-aisle shuttle outlet track.

14. The method of claim 11, further comprising:
determining a system bandwidth of the automated storage and retrieval system based at least in part on a number of shuttles of the plurality of shuttles determined to be executing a materials handling operation at a measurement instance;
identifying a third shuttle of the plurality of shuttles that is configured in a standby configuration; and
providing instructions to the third shuttle to execute a third materials handling operation, so as to increase the number of shuttles of the plurality of shuttles in operation within the automated storage and retrieval system.

15. The method of claim 11, causing a third shuttle to travel to a third storage location provided within the first storage aisle such that the third shuttle moves along the aisle track of the first storage aisle in the first shuttle travel direction and such that each of the first shuttle, the second shuttle, and the third shuttle are positioned within the first storage aisle at the first instance.

16. The method of claim 11, further comprising:
upon determining that the first shuttle has executed a first materials handling operation, providing instructions to the first shuttle to execute a second materials handling operation, including causing the first shuttle to travel to a third storage location provided within the first storage aisle such that the first shuttle moves along the aisle track of the first storage aisle in the first shuttle travel direction.

17. The method of claim 11, wherein the automated storage and retrieval system comprises a plurality of storage aisles, and wherein the method further comprises:
identifying that the first storage aisle outlet of the first storage aisle is arranged in an upstream position from a first lift interface portion corresponding to a first vertical lift relative to a unidirectional shuttle recirculation traffic flow pattern defined by the automated storage and retrieval system; and
wherein causing the first shuttle to travel to the first storage location provided within the first storage aisle comprises selectively causing the first shuttle to travel to the first storage aisle of the plurality of storage aisles based at least in part on the upstream position of the first storage aisle outlet relative to the first lift interface portion corresponding to the first vertical lift.

18. The method of claim 11, further comprising:
determining that the first shuttle is stopped along the first inter-aisle outlet track at a first lift interface position;
identifying that the second shuttle traveling along the first inter-aisle outlet track is in an upstream position relative to the first shuttle; and
causing the second shuttle to transfer from the first inter-aisle outlet track to a second inter-aisle outlet track arranged in an at least substantially parallel configuration relative to the first inter-aisle shuttle outlet track.

19. The method of claim 18, further comprising:
upon determining that the second shuttle has moved along the second inter-aisle shuttle outlet track so as to pass the first shuttle, causing the second shuttle to transfer from the second inter-aisle shuttle outlet track to the first inter-aisle outlet track; and
accessing, via the second shuttle, a second vertical lift of a plurality of vertical lifts by causing the second shuttle to travel to a second lift interface position defined along the first inter-aisle shuttle outlet track, wherein the second lift interface position is arranged downstream from the first lift interface position along the first inter-aisle shuttle outlet track.

* * * * *